United States Patent Office 3,446,765
Patented May 27, 1969

3,446,765
RIGID COMPOSITIONS COMPRISING POLYVINYL CHLORIDE, CALCIUM CARBONATE AND AN OXIDE OR HYDROXIDE
Walter Reading Pryer, Northwich, England, assignor to Imperial Chemical Industries Limited, London, England, a corporation of Great Britain
No Drawing. Filed Feb. 28, 1966, Ser. No. 530,382
Claims priority, application Great Britain, Mar. 29, 1965, 13,264/65
Int. Cl. C08f 45/56, 29/18
U.S. Cl. 260—23          5 Claims

---

ABSTRACT OF THE DISCLOSURE

Discoloration of unplasticised polyvinyl chloride compositions containing finely divided precipitated calcium carbonate caused by exposure to light is prevented by including minor amounts of oxides or hydroxides of alkaline earth metals. The preferred oxide is magnesium oxide and the preferred amount is from 1 to 5% by weight of the polyvinyl chloride.

---

This invention relates to polymer compositions based on chlorine-containing polymers derived from polymerisable vinyl compounds particularly to unplasticised or so-called rigid compositions based on polyvinyl chloride or chlorinated polyvinyl chloride and containing precipitated calcium carbonate incorporated for the purpose of increasing the impact-resistance of articles made therefrom.

It is known to incorporate finely divided precipitated calcium carbonate in compositions based on unplasticised polyvinyl chloride. The effect of the calcium carbonate is to increase the resistance of articles made from such compositions to damage by blows or mechanical shocks. Under ageing tests in artificial light however such articles sometimes discolour more quickly than similar articles that do not contain calcium carbonate. The reason for this is not completely known; it may have something to do with the particle size of the calcium carbonate since the effect is most marked when this is less than about 250 millimicrons (as determined by measurements of air-permeability or by means of an electron microscope), and it has been noticed not only with calcium carbonates having a calcite crystal form but also with those having an aragonite form. It has been noticed with uncoated calcium carbonates as well as with those coated with so-called activating agents such as long-chain fatty acids, for example stearic acid, and their calcium salts.

We have now discovered that one can prevent the discoloration occurring by incorporating in the composition small amounts of basic compounds of metals, for example oxides of magnesium, zinc and aluminium, and particularly magnesium oxide.

Thus according to our invention we provide compositions comprising an unplasticized chlorine-containing polymer derived from vinyl chloride finely divided precipitated calcium carbonate and a basic compound of a metal of Group II of the Periodic Table, or of aluminium.

The most suitable basic compounds of metals are those that impart no colour to the composition for example compounds of alkaline earth metals, magnesium, zinc and aluminium. The oxides are the most convenient and of these the preferred compound is magnesium oxide in the form known commercially as calcined magnesia. The hydroxides may also be used.

The amount of the basic compound of a metal required in the composition is small being preferably from 1 to 5 parts by weight per 100 parts by weight of polymer.

The amount of precipitated calcium carbonate is generally from 5 to 30 parts by weight per 100 parts by weight of polymer. It may be coated if desired, for example with stearic acid.

Other chemical substances may if desired be incorporated in the compositions of the invention for example stabilisers, lubricants and pigments according to known compounding practice, but it is to be understood that plasticisers are excluded.

The invention is illustrated by the following examples in which all parts are by weight.

EXAMPLE 1

Two rigid polyvinyl chloride compositions were made up to the Formulae $a$ and $b$ given in Table 1 which differ only in that $b$ contains calcined magnesia in addition to the ingredients of $a$:

TABLE 1

|   | (a) | (b) |
|---|---|---|
| (i) Polyvinyl chloride | 100 parts | 100 parts |
| (ii) Precipitated calcium carbonate coated with stearic acid | 10 | 10 |
| (iii) Barium/cadmium stabiliser | 3 | 3 |
| (iv) Fatty acid ester lubricant | 3.5 | 3.5 |
| (v) Titanium dioxide | 0.5 | 0.5 |
| (vi) Calcined magnesia |  | 1 |

Samples of the two compounds were exposed (i) for 16 days continuously to the light from a carbon arc in an apparatus for accelerated ageing tests known as a Fadeometer and (ii) for 34 days continuously to the light from a xenon discharge tube. After exposure the colour of the surfaces of the samples was assessed by measuring their reflectances, using a reflectometer manufactured by Evans Electroselenium Limited, and expressing them on a percentage scale in which the reflectance of a standard sample of magnesium carbonate is taken as 100%. The results are given in Table 2.

TABLE 2

| Compound | After 16 days in the Fadeometer | After 34 days under the xenon discharge |
|---|---|---|
| (a) No magnesia | 15% reflectance | 10% reflectance. |
| (b) With magnesia | 38% reflectance | 53% reflectance. |

EXAMPLE 2

In this example the polyvinyl chloride composition was the same as that of $a$ of Example 1 except that various amounts of calcined magnesia were incorporated. These are shown in Table 3 together with the percentage reflectances after exposure of samples for 21 days in the Fadeometer. Parts by weight of magnesia are per 100 parts by weight of polyvinyl chloride.

Table 3

| Magnesia (parts by wt.) | Reflectance, percent |
|---|---|
| 0 | 19 |
| 1.5 | 41 |
| 2.0 | 49 |
| 3.0 | 50 |
| 4.0 | 41 |
| 5.0 | 42 |

What I claim is:

1. Unplasticized compositions of matter comprising a polymer selected from polyvinyl chloride and chlorinated polyvinyl chloride, finely divided precipitated calcium carbonate and a minor proportion of a basic compound of a metal selected from oxides and hydroxides of alkaline earth metals, magnesium, zinc and aluminium.

2. Compositions of matter as claimed in claim 1 in which the polymer is polyvinyl chloride.

3. Compositions of matter as claimed in claim 1 in which the basic compound of a metal is magnesium oxide, MgO.

4. Compositions of matter as claimed in claim 3 in which the amount of magnesium oxide is from 1 to 5 parts by weight per 100 parts by weight of polymer.

5. Compositions of matter comprising unplasticised polyvinyl chloride, from 5 to 30 parts by weight per 100 parts of polyvinyl chloride of a precipitated calcium carbonate coated with an activating agent selected from stearic acid and calcium stearate, and from 1 to 5 parts by weight per 100 parts by weight of polyvinyl chloride of calcined magnesia.

References Cited

UNITED STATES PATENTS

| 2,403,215 | 7/1946 | Foster | 260—23 |
|---|---|---|---|
| 2,663,695 | 12/1953 | Perloff et al. | 260—23 |
| 3,261,793 | 7/1966 | Stevenson | 260—23 |
| 3,268,623 | 8/1966 | Beer | 260—876 |
| 3,310,522 | 3/1967 | Takahashi et al. | 260—41 |
| 3,362,924 | 1/1968 | Eastman | 260—23 |

DONALD E. CZAJA, *Primary Examiner.*

R. A. WHITE, *Assistant Examiner.*

U. S. Cl. X.R.

117—123; 260—41, 45.7, 45.75